US012780104B2

(12) United States Patent
Gerczak

(10) Patent No.: US 12,780,104 B2
(45) Date of Patent: Nov. 3, 2026

(54) VEHICLE ROOF DRIP CHANNEL MOUNTING SYSTEM FOR ROOF RACK AND ROOF RAIL ATTACHMENT

(71) Applicant: Toyota Motor Engineering & Manufacturing North America, Inc., Plano, TX (US)

(72) Inventor: Mitchell J. Gerczak, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 155 days.

(21) Appl. No.: 18/962,705

(22) Filed: Nov. 27, 2024

(65) Prior Publication Data

US 2026/0145618 A1 May 28, 2026

(51) Int. Cl.
*B60R 9/04* (2006.01)
*B62D 25/07* (2006.01)

(52) U.S. Cl.
CPC ................ *B60R 9/04* (2013.01); *B62D 25/07* (2013.01)

(58) Field of Classification Search
CPC .............. B60R 9/04; B60R 9/045; B60R 9/05
See application file for complete search history.

(56) References Cited

U.S. PATENT DOCUMENTS

| | | | | |
|---|---|---|---|---|
| 4,688,706 A * | 8/1987 | Thulin | B60R 9/058 | 224/322 |
| 5,275,320 A * | 1/1994 | Duemmler | B60R 9/045 | 224/330 |
| 5,419,479 A * | 5/1995 | Evels | B60R 9/045 | 224/322 |
| 5,553,761 A | 9/1996 | Audoire et al. | | |
| 5,556,221 A * | 9/1996 | Brunner | F16B 2/10 | 403/321 |
| 5,794,826 A * | 8/1998 | Cronce | B60R 9/045 | 116/282 |
| 5,845,828 A * | 12/1998 | Settelmayer | B60R 9/045 | 224/331 |
| 6,338,428 B1 * | 1/2002 | Kawasaki | B60R 9/04 | 224/326 |
| 7,090,103 B2 | 8/2006 | Aftanas et al. | | |
| 8,333,311 B2 | 12/2012 | Hubbard | | |

(Continued)

FOREIGN PATENT DOCUMENTS

| | | |
|---|---|---|
| AU | 2023201298 A1 | 3/2023 |
| EP | 3243702 B1 | 12/2018 |

(Continued)

*Primary Examiner* — Yanick A Akaragwe
(74) *Attorney, Agent, or Firm* — Snell & Wilmer LLP

(57) ABSTRACT

Methods, systems, and apparatus for a roof drip channel mounting system include a first member structured to be attached to a roof of a vehicle, a first plug pivotally coupled to the first member, a second plug pivotally coupled to the first member, and a wedge movably coupled to the first member and disposed between the first plug and the second plug. The first plug and the second plug are configured to pivot in opposite directions with respect to the first member in response to the wedge extending from the first member to mechanically lock the roof rack mounting system to the roof of the vehicle.

20 Claims, 10 Drawing Sheets

(56) References Cited

U.S. PATENT DOCUMENTS

| | | | | |
|---|---|---|---|---|
| 8,485,403 | B2 | 7/2013 | Stahl et al. | |
| 8,720,761 | B2 | 5/2014 | Binder et al. | |
| 9,187,047 | B2 | 11/2015 | Sautter et al. | |
| 9,421,918 | B2 | 8/2016 | Lundgren | |
| 10,131,222 | B1 | 11/2018 | Tier et al. | |
| 10,160,393 | B2 * | 12/2018 | Ranka | B60R 9/052 |
| 10,611,311 | B1 * | 4/2020 | Chervu | B60R 9/052 |
| 11,027,661 | B2 | 6/2021 | Griffith et al. | |
| 2006/0191968 | A1 * | 8/2006 | Stapleton | B60R 9/04 224/325 |
| 2007/0194069 | A1 * | 8/2007 | Binder | B60R 9/04 224/326 |
| 2008/0034561 | A1 * | 2/2008 | Emmerling | B60R 9/055 24/514 |
| 2013/0284779 | A1 * | 10/2013 | Sautter | B60R 9/048 224/323 |
| 2018/0222396 | A1 * | 8/2018 | Binder | B60R 9/04 |
| 2018/0236946 | A1 | 8/2018 | Shen | |
| 2019/0061635 | A1 * | 2/2019 | Connolly | B60R 9/058 |
| 2019/0100150 | A1 | 4/2019 | McFadden et al. | |
| 2021/0046881 | A1 * | 2/2021 | Vidar | B60R 9/058 |

FOREIGN PATENT DOCUMENTS

| | | | |
|---|---|---|---|
| GB | 2411626 | A | 7/2005 |
| WO | 2004087465 | A1 | 10/2024 |

* cited by examiner

VEHICLE ROOF DRIP CHANNEL MOUNTING SYSTEM FOR ROOF RACK AND ROOF RAIL ATTACHMENT

BACKGROUND

Field

The present disclosure generally relates to roof racks for motor vehicles and, more particularly, to vehicle roof rack mounting systems which attach to the roof ditch molding channels.

Description of the Related Art

There are various reasons for transporting cargo (e.g., luggage, goods, and/or other articles) on the roof of a vehicle. For example, the internal space in the vehicle may be limited, or dirty and soiled cargo are undesired to store and transport inside (e.g., the trunk) of the vehicle.

Thus, load carrier arrangements for transporting cargo on the roof of a vehicle have been developed. A typical load carrier arrangement has at least one load carrier bar which is arranged over the roof of the vehicle transversal to the driving direction of the vehicle. At each end of the load carrier bar, a respective load carrier foot (also referred to as a mounting foot) is arranged to hold a respective end portion of the load carrier bar, e.g., by means of a fastening arrangement having rivets, or screws and nut arrangements. Vehicle roof designs vary by vehicle class, type, and manufacturer.

Accordingly, it is desirable to provide systems, methods, and techniques for attachment of a load carrier arrangement suitable for various vehicles.

SUMMARY

One aspect of the subject matter described in this disclosure may be embodied in a roof rack mounting system. The roof rack mounting system can include a first member structured to be attached to a roof of a vehicle, a threaded fastener configured to be threadingly coupled to the first member, a first plug (also referred to as a first paddle) pivotally coupled to the first member, a second plug (also referred to as a second paddle) pivotally coupled to the first member, and a wedge movably coupled to the first member and disposed between the first plug and the second plug. The wedge can be configured to extend from the first member in response to the threaded fastener rotating with respect to the first member. The first plug and the second plug are configured to pivot in opposite directions with respect to the first member in response to the wedge extending from the first member to mechanically lock the roof rack mounting system to the roof of the vehicle.

In one aspect, the subject matter may be embodied in a vehicle. The vehicle can include a roof including an elongated slot. The vehicle can further include a roof rack mounting system coupled to the vehicle via the elongated slot. The roof rack mounting system can include a first member structured to be attached to the roof of the vehicle. The roof rack mounting system can include a threaded fastener threadingly coupled to the first member. The roof rack mounting system can include a first plug pivotally coupled to the first member and located at least partially in the elongated slot and a second plug pivotally coupled to the first member and located at least partially in the elongated slot. The roof rack mounting system can include a wedge movably coupled to the first member and disposed between the first plug and the second plug. The wedge can be configured to extend from the first member in response to the threaded fastener rotating with respect to the first member. The first plug and the second plug are configured to pivot in opposite directions with respect to the first member in response to the wedge extending from the first member to mechanically lock the roof rack mounting system to the roof of the vehicle.

These and other aspects may optionally include one or more of the following features.

The first member can have a first threaded aperture. The first threaded aperture can define a central axis. The first plug can be configured to pivot about a second axis oriented perpendicular to the central axis.

The roof rack mounting system can further include a load plate movable with respect to the first member and configured to move with the threaded fastener to apply a force to the wedge to cause the wedge to extend from the first member. The roof rack mounting system can further include a first load pin extending from the load plate at least partially through the first member, and the first load pin is configured to apply the force to the wedge. The roof rack mounting system can further include a second load pin extending from the load plate at least partially through the first member, and the second load pin is configured to apply the force to the wedge.

The roof rack mounting system can further include a second threaded aperture disposed in the first member, the second threaded aperture can be configured to receive a second threaded fastener for mounting a roof rack to the first member.

The roof rack mounting system can further include a rounded slot disposed in the first member. The first plug can include a rounded protuberance sized and configured to be received in the rounded slot whereby the first plug rotates with respect to the first member.

The threaded fastener can be coupled to the wedge via a swivel connection whereby the threaded fastener is configured to rotate with respect to the wedge.

The elongated slot can be a drip channel of the roof.

The vehicle can further include a crossmember mounted to the first member and extending over the roof of the vehicle.

The threaded fastener and the wedge can be vertically aligned along a common vertical plane.

In one aspect, the subject matter may be embodied in a method. The method can be for attaching a roof rack mounting system to a vehicle. The method can include moving the roof rack mounting system at least partially into an elongated slot disposed in a roof of the vehicle. The method can include rotating a threaded fastener with respect to a first member of the roof rack mounting system to cause the threaded fastener to translate along a threaded aperture of the first member. The method can include moving a wedge to extend from the first member in response to the threaded fastener rotating with respect to the first member. The method can include rotating a first plug and a second plug with respect to the first member in response to the wedge extending from the first member to mechanically lock the roof rack mounting system to the roof of the vehicle.

In various aspects, the first plug and the second plug can rotate in opposite directions.

The method can further include moving a load plate together with the threaded fastener. The method can further include applying a force on the wedge with the load plate in response to the load plate moving together with the threaded fastener to cause the wedge to extend from the first member.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, methods, devices, and/or vehicles for implementing a roof drip channel mounting system (also referred to herein as a roof rack mounting system) for attaching a roof rack, a roof rail, or any other desired member(s) to a roof of a vehicle. The roof rack mounting system includes a base member (also referred to herein as a first member) structured to be attached to a roof of a vehicle, first and second paddles (also referred to herein as plugs) pivotally coupled to the first member, and a wedge movably coupled to the first member and disposed between the first plug and the second plug. The wedge is configured to extend from the first member to force the first and second plugs to pivot in opposite directions with respect to the first member to mechanically lock the roof rack mounting system to the roof of the vehicle. In this manner, the roof rack mounting system can be expanded to "wedge" itself into a drip channel (or any other suitable vehicle roof channel) disposed in the roof of the vehicle.

Some vehicles (e.g., sedans) can be manufactured with relatively narrow drip channels in the roof (e.g., compared to SUVs and other larger class vehicles). For example, SUV drip channels are typically wider (e.g., 2× wider) than those of sedans and can accommodate through holes for roof rack connections using a weld nut and bolt connection. A roof rack mounting system with a wedge and plug configuration can be inserted into narrow channels without having to modify the channel (e.g., no through hole is required). A roof rack mounting system with a wedge and plug configuration can be used with narrow vehicle roof channels while accommodating a standard roof rack configuration. A roof rack mounting system with a wedge and plug configuration provides an accessible attachment for the roof rack. A roof rack mounting system with a wedge and plug configuration can accommodate a sleek low profile roof rack.

Figure 1A:
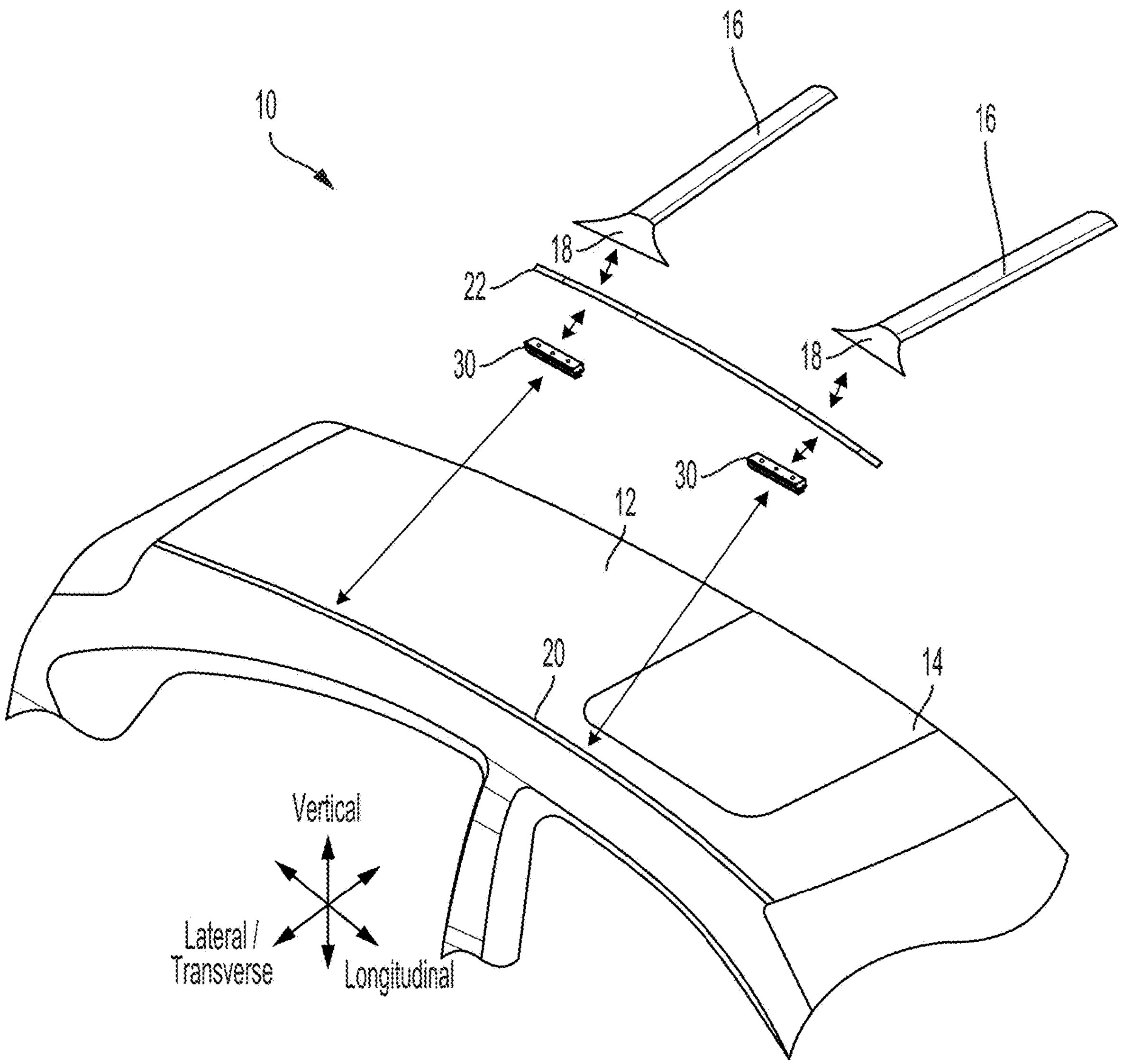
FIG. 1A and FIG. 1B are schematic perspective views of a portion of a vehicle showing a general design of a roof-mounted cargo rack, according to various aspects of the invention.

FIG. 1A is an assembly view of a cargo rack 10 for a roof 12 of a vehicle 14. The cargo rack 10 generally includes one or more bars or crossmembers 16 that extend across a width of the vehicle 14. Stated differently, the bars 16 extends transversely across the vehicle 14 in a direction that is perpendicular to the longitudinal direction of the vehicle 14 (i.e., the driving direction of the vehicle 14). A support foot 18 can be coupled to each end of each bar 16. The bar(s) 16 can be supported by the feet 18. The bar 16 and the feet 18 can be configured to support a load (e.g., cargo) whereby the load is transferred via a load path from the bar 16, into the feet 18, and into the roof 12 of the vehicle 14.

The feet 18 can be coupled to the roof 12 via elongated channels 20 disposed in the roof 12. The elongated channels 20 can be roof ditch molding channels. The elongated channels 20 can be relatively narrow channels. The elongated channels 20 can have a width W of between 8 mm and 16 mm in various aspects, between 11 mm and 14 mm in various aspects, or about 12.5 mm in various aspects. The elongated channels 20 can have a wedge shape. That is, the width W of the opening (see FIG. 2C at width W) of the elongated channel 20 can be less than the width of the opening at the bottom of the elongated channel 20. In this regard, the width of the channel 20 can increase (e.g., monotonically increase) from the opening toward the bottom surface thereof. This geometry can help secure the roof rack mounting system to the elongated channel 20.

Figure 2A:
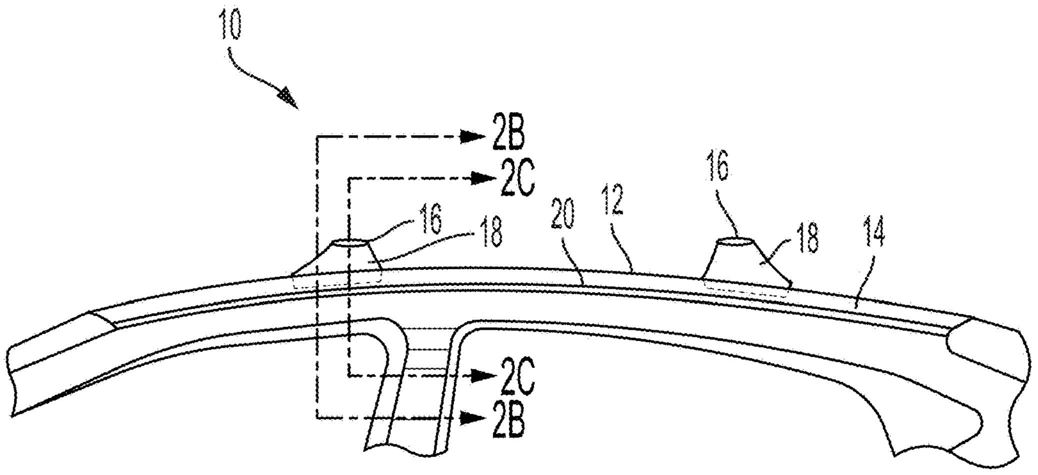
FIG. 2A is a side view of a roof drip channel mounting system installed on the roof of a vehicle, according to various aspects of the invention.
Figure 2B:
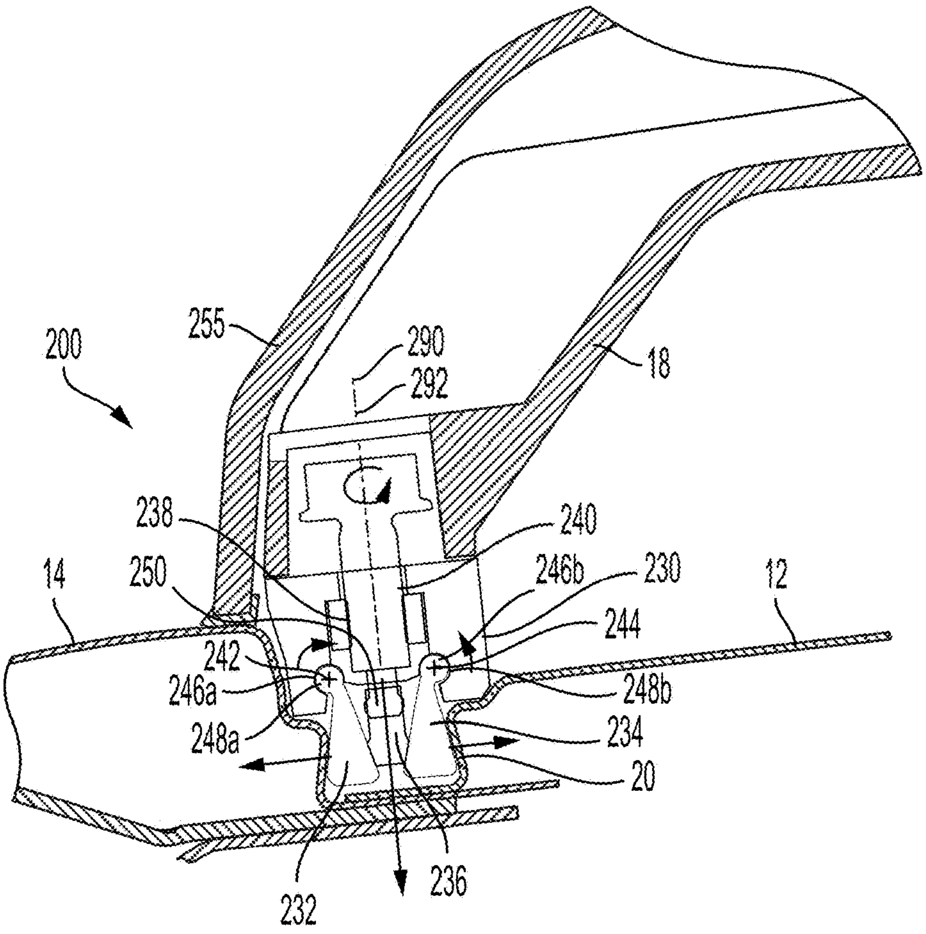
FIG. 2B is a cross sectional view of the roof drip channel mounting system of FIG. 2A taken along line A-A, according to various aspects of the invention.
Figure 2C:
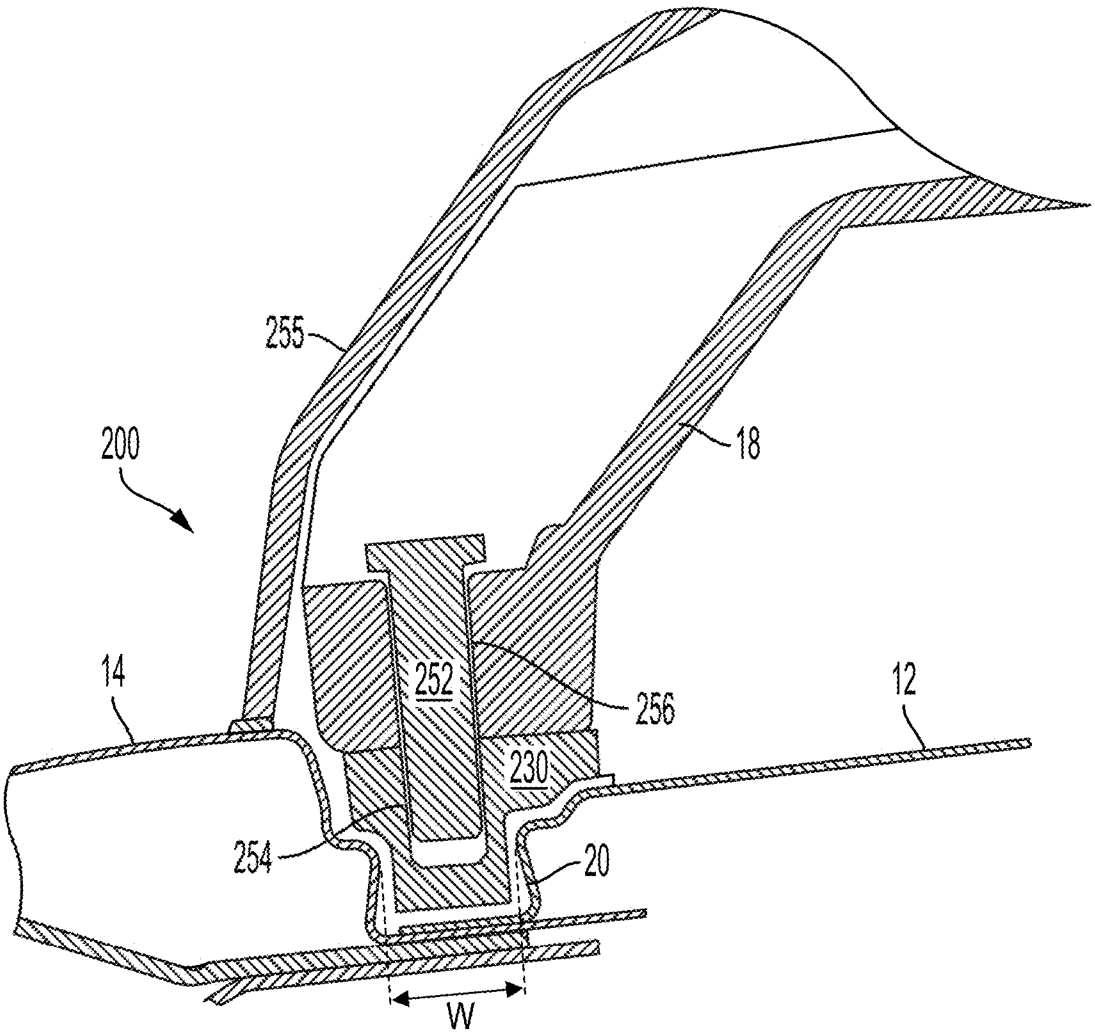
FIG. 2C is a cross sectional view of the roof drip channel mounting system of FIG. 2A taken along line B-B, according to various aspects of the invention.

The bar 16 and the foot 18 can be mounted to the roof 12 via a roof rack mounting system, which can include one or more base members 30, for example as more clearly shown in FIG. 2B and FIG. 2C. The base members 30 can be inserted at least partially into the elongated channel 20 and secured to the roof 12, as described in greater detail herein. In various aspects, a rail 22 can be mounted to the base members 30 and the feet 18 can be mounted to the rail 22; though in various aspects the rail 22 can be omitted and the feet 18 can be mounted directly to the based members 30. Accordingly, the base members 30 can provide an attachment surface for the roof rail and/or cross bar system to attach to the roof 12 of the vehicle 14. The rail 22 can extend along the entire length of the elongated channel 20 or can extend only along a portion of the entire length of the elongated channel 20.

Figure 1B:
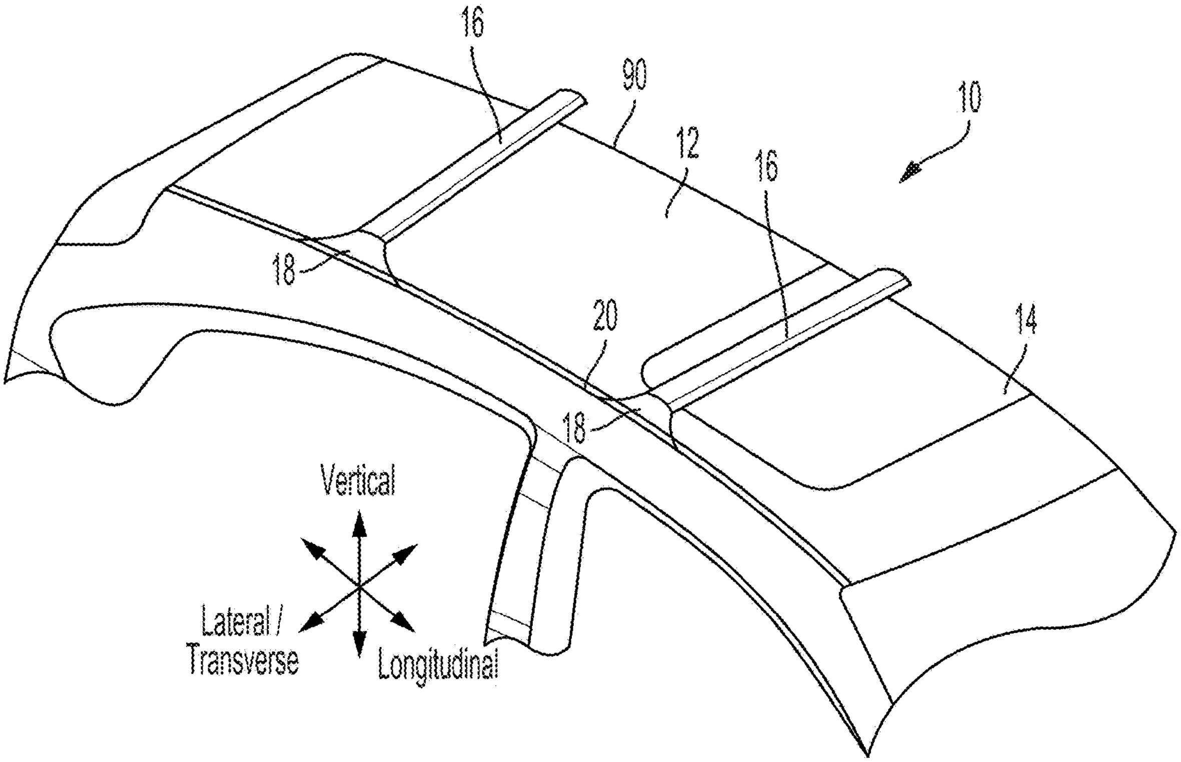

FIG. 1B is an assembled view of the cargo rack 10 mounted to the roof 12 of the vehicle 14. The cargo rack 10 may be retrofitted, coupled to, include or be included with the vehicle 14. A vehicle 14 is a conveyance capable of transporting a person, an object, or a permanently or temporarily affixed apparatus. The vehicle 14 may be a self-propelled wheeled conveyance, such as a car, a sports utility vehicle, a truck, a bus, a van or other motor, battery or fuel cell driven vehicle. For example, the vehicle 14 may be an electric vehicle, a hybrid vehicle, a hydrogen fuel cell vehicle, a plug-in hybrid vehicle or any other type of vehicle that has a fuel cell stack, a motor, and/or a generator. Other examples of vehicles include trains, planes, or boats, and any other form of conveyance that is capable of transportation.

In FIG. 1A and FIG. 1B, the cargo rack 10 and the vehicle 14 are split along the centerline 90 of the vehicle 14, though it should be understood that the other half of the cargo rack 10 and the vehicle 14 is generally a mirror image of that shown.

FIG. 2A shows a side view of the cargo rack 10 installed on the roof 12 of the vehicle 14. The bars 16 can have an aerodynamic shape to reduce drag forces while the vehicle 14 is moving. For example, the bars 16 can be flat (i.e., a cross-section geometry of the bars 16 is shorter in the vertical direction than in the longitudinal direction). In various aspects, the bars 16 can have an airfoil shape. The bar 16 and the foot 18 can be mounted to the roof 12 via a roof rack mounting system, for example, as more clearly shown in FIG. 2B and FIG. 2C.

FIG. 2B is a cross sectional view of the roof rack mounting system 200 taken along line A-A of FIG. 2A in accordance with various aspects. The roof rack mounting system 200 generally includes a first member 230 (also referred to as a base or a base member), a first plug 232 (also referred to as a paddle) pivotally coupled to the first member 230, a second plug 234 (also referred to as a paddle) pivotally coupled to the first member 230, and a wedge 236 movably coupled to the first member 230 and disposed between the first plug 232 and the second plug 234. The first member 230 is structured to be attached to the roof 12 of the vehicle 14 via the first and second plugs 232, 234. The first member 230 can include a threaded aperture 238 (also referred to herein as a first threaded aperture). The roof rack mounting system 200 can further include a threaded fastener 240 (e.g., a bolt or the like) configured to be threadingly coupled to the first member 230 via the threaded aperture 238. The threaded fastener 240 and the wedge 236 can be vertically aligned along a common vertical plane. The threaded fastener 240 and the wedge 236 can be vertically aligned along a center axis 292 of the threaded fastener 240. The threaded fastener 240 can rotate about the center axis 292 to translate the wedge 236 along the center axis 292 to cause the first plug 232 and the second plug 234 to pivot with respect to the first member 230.

The wedge 236 can be configured to extend from the first member 230 in response to the threaded fastener 240 rotating in a first rotational direction about the center axis 292 with respect to the first member 230. The first plug 232 and the second plug 234 can be configured to pivot in opposite directions with respect to the first member 230 in response to the wedge 236 extending from the first member 230 to mechanically lock the roof rack mounting system 200 to the roof 12 of the vehicle 14. More particularly, the first plug 232 and the second plug 234 can be received at least partially into the channel 20 of the roof 12. The wedge 236 can initially be in a retracted position to allow the first plug 232 and the second plug 234 to rotate toward one another to fit into the channel 20. For example, the threaded fastener 240 can rotate in a second rotational direction about the center axis 292 with respect to the first member 230 to retract the wedge 236. Once the first plug 232 and the second plug 234 are inserted into the channel 20, the threaded fastener 240 can be rotated in the first rotational direction about the center axis 292 with respect to the first member 230 to extend the wedge 236. As the wedge 236 extends, the wedge 236 applies opposing outward forces to the first plug 232 and the second plug 234 which causes the first plug 232 and the second plug 234 to rotate away from one another about their respective axis 242, 244. The first plug 232 and the second plug 234 can contact opposing inner walls of the channel 20 and mechanically lock the roof rack mounting system 200 to the roof 12.

In various aspects, the channel 20 comprises a wedge shape that tapers outward toward the bottom of the channel 20. The outer profile of the first plug 232 and the second plug 234 can comprise a flared profile when the first plug 232 and the second plug 234 are rotated outward, for example as depicted in FIG. 2B. The flared profile of the first and second plugs 232, 234 can correspond to the flared profile of the channel 20. The flared profile of the first and second plugs 232, 234 and the channel 20 can assist in creating the mechanical lock between the roof 12 and the roof rack mounting system 200.

In various aspects, the rotational axis 242 of the first plug 232 is parallel to the rotational axis 244 of the second plug 234. The rotational axes 242, 244 can extend substantially parallel to the longitudinal direction of the vehicle 14. The rotational axes 242, 244 can be oriented substantially perpendicular to the center axis 292.

In various aspects, the first member 230 includes a first slot 246*a* whereby the first plug 232 is pivotally coupled to the first member 230. The first plug 232 can include a protuberance 248*a* sized and configured to be received in the slot 246*a* whereby the first plug 232 rotates with respect to the first member 230. The first slot 246*a* can be a round slot. The first protuberance 248*a* can be a round protuberance. The first protuberance 248*a* can be shaped as a round rod.

In various aspects, the first member 230 includes a second slot 246*b* whereby the second plug 234 is pivotally coupled to the first member 230. The second plug 234 can include a second protuberance 248*b* sized and configured to be received in the slot 246*b* whereby the second plug 234 rotates with respect to the first member 230. The second slot 246*b* can be a round slot. The second protuberance 248*b* can be a round protuberance. The second protuberance 248*b* can be shaped as a round rod. The first slot 246*a* and the second slot 246*b* can be oriented parallel to the axes 242, 244, respectively. In various aspects, the first and second slots 246*a*, 246*b* are coaxially aligned with the rotational axes 242, 244, respectively.

In various aspects, the threaded fastener 240 is coupled to the wedge 236 via a swivel connection 250 whereby the threaded fastener 240 is configured to rotate with respect to the wedge 236. The swivel connection 250 can be configured as a ball and socket type connection or the like. This allows the threaded fastener 240 to rotate with respect to the wedge 236 while maintaining the vertical position of the threaded fastener 240 with respect to the wedge 236. Stated differently, the threaded fastener 240 and the wedge 236 are configured to translate together along the center axis 292.

In various aspects, a cover 255 can be coupled over the foot 18 for aesthetic purposes, and/or to provide a protective covering over the foot 18 and the roof rack mounting system 200. The cover 255 can be shaped and sized as an aerodynamic cowl. The cover 255 can be located outboard (i.e., with respect to the longitudinal centerline of the vehicle) from the foot 18.

FIG. 2C is a cross sectional view of the roof rack mounting system 200 taken along line B-B of FIG. 2A in accordance with various aspects. The roof rack mounting system 200 can further include a fastener 252 (e.g., a bolt or the like) configured to couple the foot 18 to the first member 230. The first member can include a second threaded aperture 254 configured to receive the fastener 252. The foot 18 can include an aperture 256 configured to receive the fastener 252. The fastener 252 can extend through the aperture 256 and be threadingly coupled to the first member 230 via the threaded aperture 254 to secure the foot 18 to the first member 230.

Figure 2D:
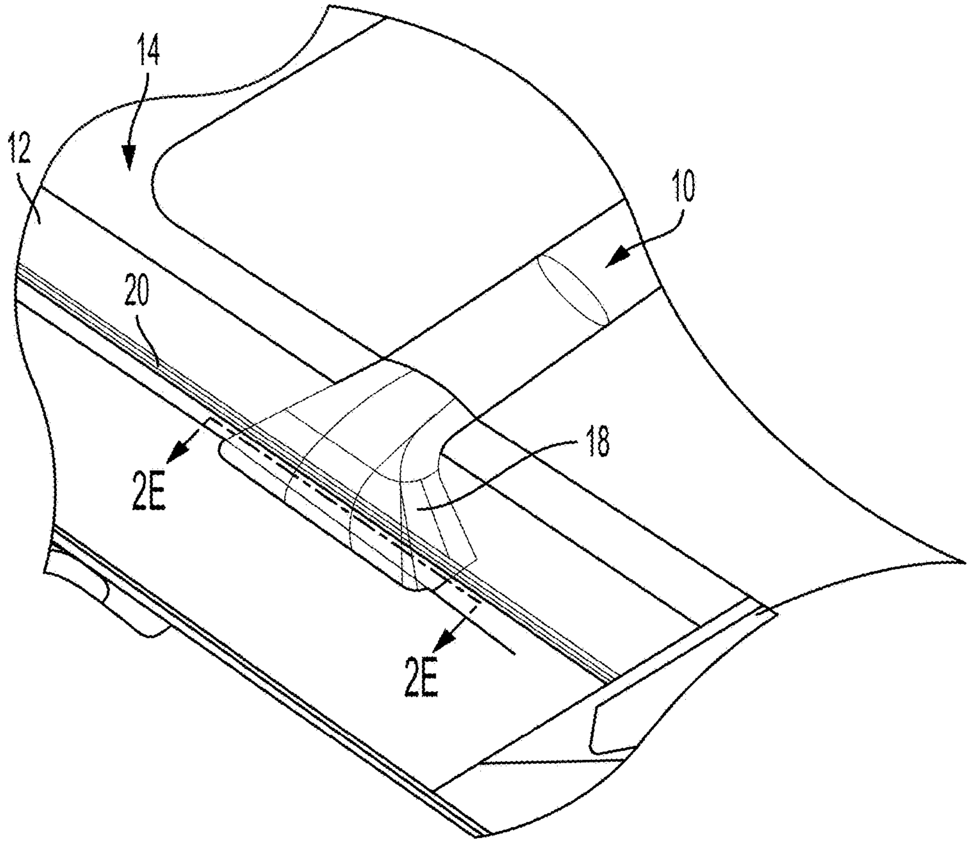
FIG. 2D is a perspective view of the roof drip channel mounting system of FIG. 2A, according to various aspects of the invention.
Figure 2E:
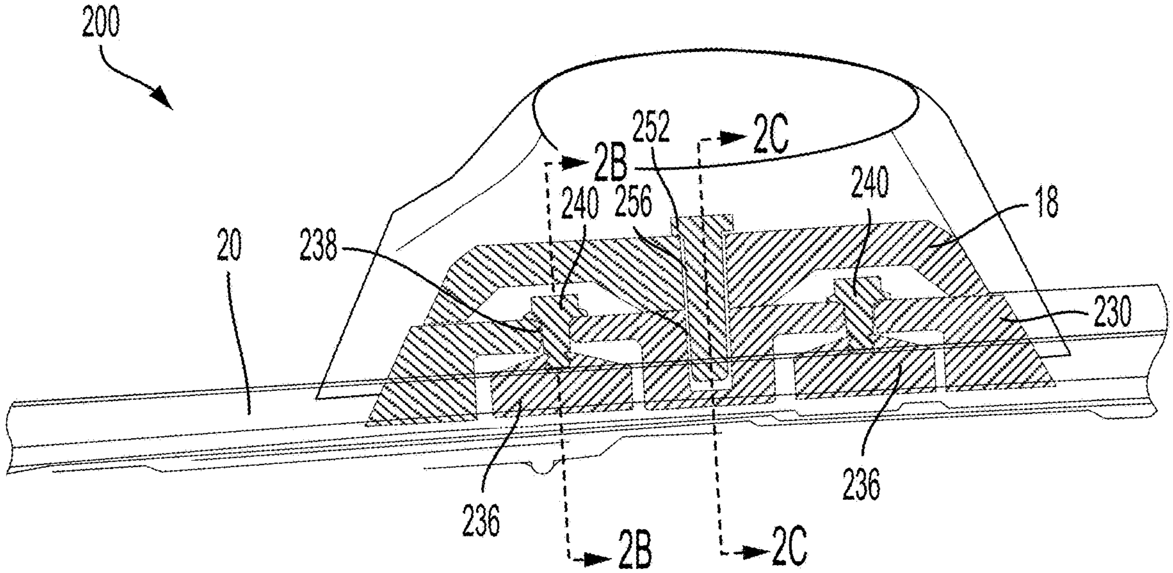
FIG. 2E is a cross sectional view of the roof drip channel mounting system of FIG. 2D taken along line C-C, according to various aspects of the invention.

FIG. 2D shows a perspective view of the cargo rack 10 installed on the roof 12 of the vehicle 14. FIG. 2E is a cross sectional view of the roof rack mounting system 200 taken along line C-C of FIG. 2D in accordance with various aspects. With reference to FIG. 2E, the fastener 252 can be longitudinally spaced apart from the fastener 240. In various aspects, the first member 230 includes a plurality of wedge and plug arrangements (i.e., a fastener 240, a wedge 236, and corresponding plugs 232, 234) disposed longitudinally along the first member 230. In this manner, the first member 230 can be mechanically locked to the channel 20 of the roof 12 at a plurality of discrete points which can provide enhanced attachability and prevent the first member 230 from coming lose based on a single point of failure. Moreover, due to manufacturing tolerances the width of the channel 20 can vary. Providing multiple points of attachment can allow for each of the wedges 236 to be individually adjusted based on the width of the channel 20 to tighten the roof rack mounting system 200.

Figure 3:
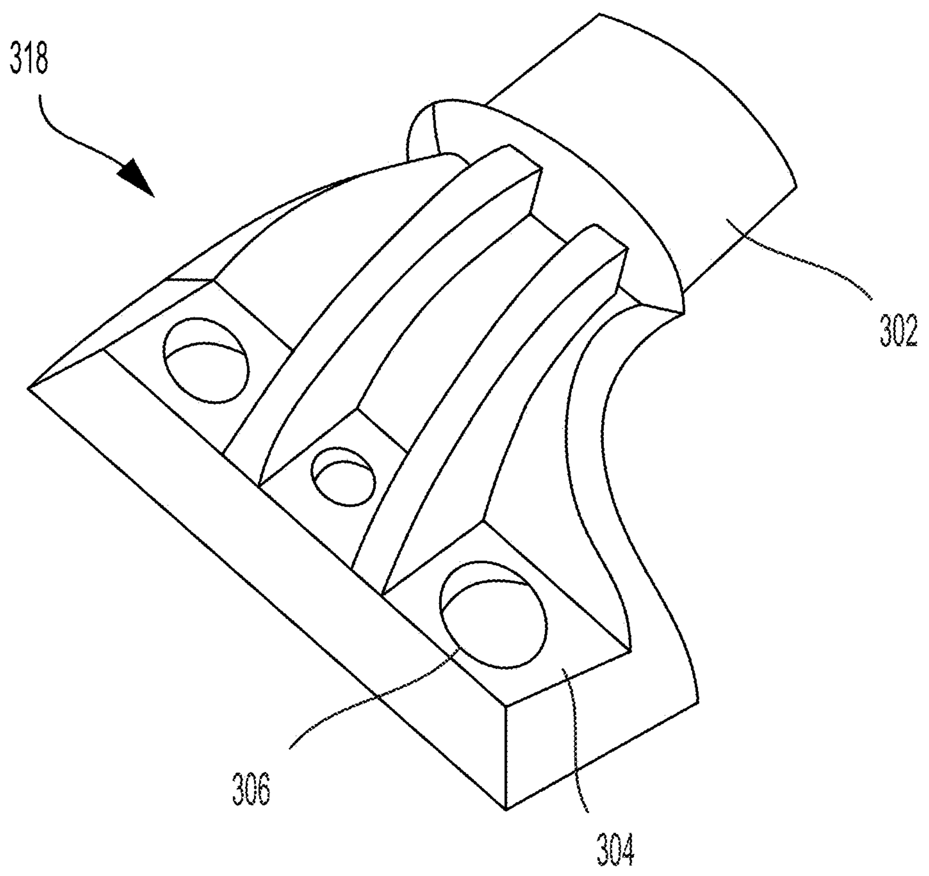
FIG. 3 is a schematic perspective view of a foot for a roof drip channel mounting system, according to various aspects of the invention.

FIG. 3 shows an example foot 318 for use with a roof rack mounting system. The foot 318 can be similar to the foot 18 described herein in various aspects. The foot 318 can include a first attachment portion 302 configured to receive a bar or crossmember (e.g., see bar 16 of FIG. 1B). For example, the first attachment portion 302 can be sized and configured to be received into a hollow end of the bar 16. The foot 318 can include a second attachment portion 304 configured to be attached to a first member 230 of the roof rack mounting system. The second attachment portion 304 can include one or more apertures 306 for receiving a fastener whereby the second attachment portion 304 is coupled to the first member of the roof rack mounting system. One or more of the apertures 306 can accommodate and/or provide access to fasteners of the wedge and plug arrangements (e.g., see fastener 240 of FIG. 2B). The foot 318 can be made out of a plastic material. The foot 318 can include a plurality of stiffening ribs to increase a stiffness of the foot 318.

Figure 4:
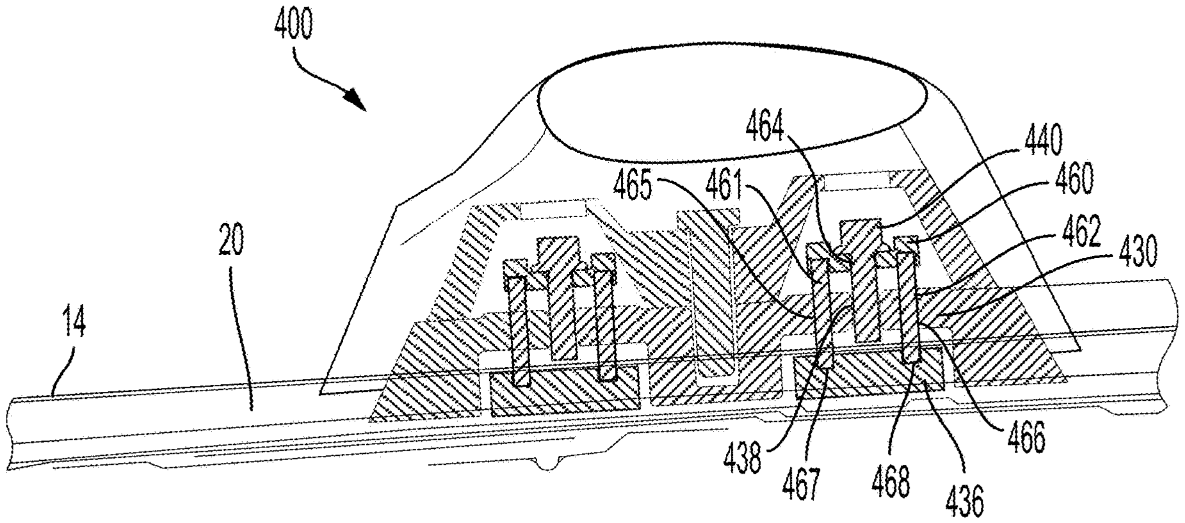
FIG. 4 is a schematic view of a roof drip channel mounting system including a load plate and in an installed position on a vehicle, according to various aspects of the invention.

FIG. 4 is a section view, similar to the section view C-C of FIG. 2E, except the roof rack mounting system 400 further includes a load plate 460 for translating the wedge 436 with respect to the first member 430. The roof rack mounting system 400 can be functionally similar to the roof rack mounting system 200 described with respect to FIGS. 2A through 2E, except the roof rack mounting system 400 further includes the load plate 460 and load pins 461, 462 for translating the wedge 436 with respect to the first member 430.

The roof rack mounting system 400 generally includes a first member 430 (also referred to as a base member), a first plug 432 pivotally coupled to the first member 430, a second plug 434 pivotally coupled to the first member 430, and a wedge 436 movably coupled to the first member 430 and disposed between the first plug 432 and the second plug 434. The first member 430 can include a threaded aperture 438 (also referred to herein as a first threaded aperture). The roof rack mounting system 400 can further include a threaded fastener 440 (e.g., a bolt or the like) configured to be threadingly coupled to the first member 430 via the threaded aperture 438. The load plate 460 can include an aperture 464 configured to receive the threaded fastener 440 therethrough. The threaded fastener 440 can extend through the aperture 464 and be threadingly coupled to the first member 430 via the threaded aperture 438. In this regard, the aperture 464 and the threaded aperture 438 can be coaxially aligned when the threaded fastener 440 is in the installed position. The roof rack mounting system 400 can further include a first load pin 461 and a second load pin 462 disposed between the load plate 460 and the first and second plugs 432, 434, respectively. The load plate 460 can be clamped between the head of the threaded fastener 440 and the first and second load pins 461, 462 by the threaded fastener 440. The threaded fastener 440 can be rotated in a first rotational direction to tighten the threaded fastener 440 and move the load plate 460 toward the first member 430. As load plate 460 is pushed toward the first member 430, the load plate 460 pushes the first load pin 461 and the second load pin 462 toward the wedge 436 (i.e., in response to the load plate 460 moving toward the first member 430) which in turn push the wedge 436 to extend from the first member 430. As the wedge 436 extends from the first member 430, the wedge 436 applies outward forces on the first and second plugs (e.g., similar to first and second plugs 232, 234 of FIG. 2B) which causes the first plug and the second plug to pivot outward away from the wedge 436 to mechanically lock the roof rack mounting system 400 to the channel 20 of the roof 12.

The first member 430 can include a first load pin aperture 465 and a second load pin aperture 466. The first load pin 461 can extend through the first load pin aperture 465. The second load pin 462 can extend through the second load pin aperture 466. The wedge 436 can include a first dimple or depression 467 and a second dimple or depression 468. The first dimple 467 can receive the first load pin 461. The first load pin 461 can be configured to contact the wedge 436 at the first dimple 467. The second dimple 468 can receive the second load pin 462. The second load pin 462 can be configured to contact the wedge 436 at the second dimple 468.

FIGS. 5A through 5F show perspective, side, front, front section, side section, and assembly views, respectively, of a roof rack mounting system 500 in accordance with various aspects. The roof rack mounting system 500 can be functionally similar to the roof rack mounting system 400 described with respect to FIG. 4A and FIG. 4B.

The roof rack mounting system 500 generally includes a first member 530 (also referred to as a base member), a first plug 532 pivotally coupled to the first member 530, a second plug 534 pivotally coupled to the first member 530, a wedge 536 movably coupled to the first member 530 and disposed between the first plug 532 and the second plug 534, a threaded fastener 540, a load plate 560 movable with respect to the first member 530, a first load pin 561 coupled between the load plate 560 and the wedge 536, and a second load pin 562 coupled between the load plate 560 and the wedge 536.

The first member 530 can include a threaded aperture 538 (also referred to herein as a first threaded aperture). The threaded aperture 538 can be defined by a nut fastener 572. The nut fastener 572 and threaded aperture 538 can be a separate component from the first member 530. However, the threaded aperture 538 can be defined by a surface that is monolithic with the body of the first member 530 (e.g., the nut fastener 572 can be omitted or the nut fastener 572 can be integrally—e.g., monolithically—formed with the first member 530). The first member 530 can include a cavity 574 configured to receive the nut fastener 572 therein. The load plate 560 can include a cavity 576 configured to accommodate the head of the threaded fastener 540.

The first member 530 can include a first load pin aperture 565 and a second load pin aperture 566. The first load pin 561 can extend through the first load pin aperture 565. The second load pin 562 can extend through the second load pin aperture 566. The wedge 536 can include a first dimple 567 and a second dimple 568. The first dimple 567 can receive the first load pin 561. The first load pin 561 can be configured to contact the wedge 536 at the first dimple 567. The second dimple 568 can receive the second load pin 562. The second load pin 562 can be configured to contact the wedge 536 at the second dimple 568.

Figure 5A:
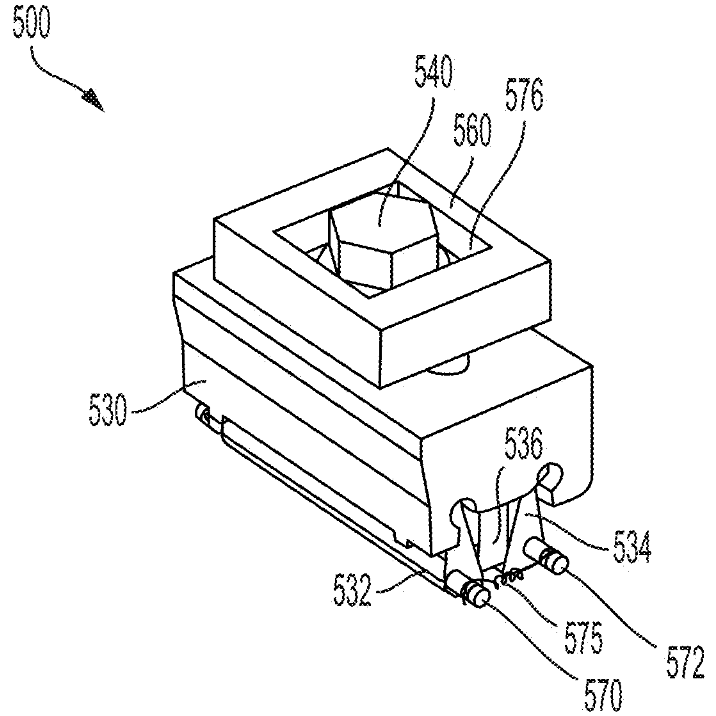
FIGS. 5A-5F are perspective, side, front, front section, side section, and assembly views of the roof drip channel mounting system of FIG. 4, according to various aspects of the invention.
Figure 5B:
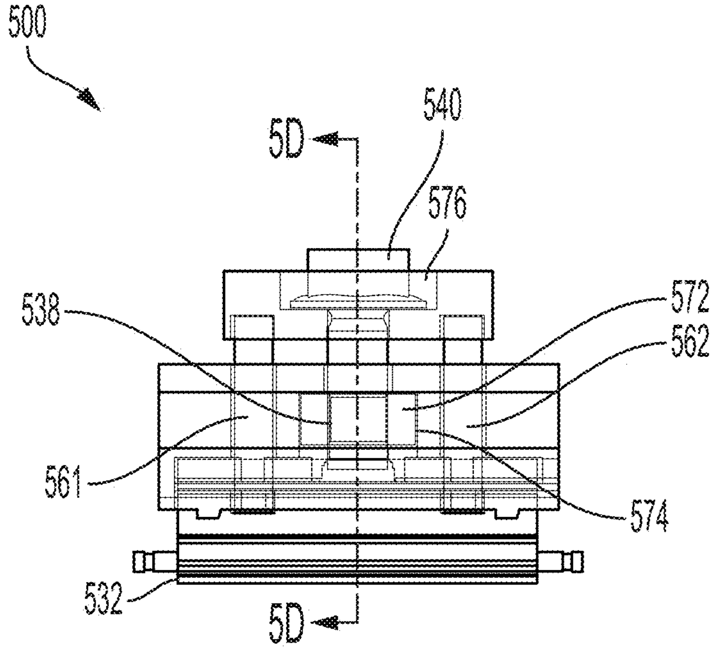
Figure 5C:
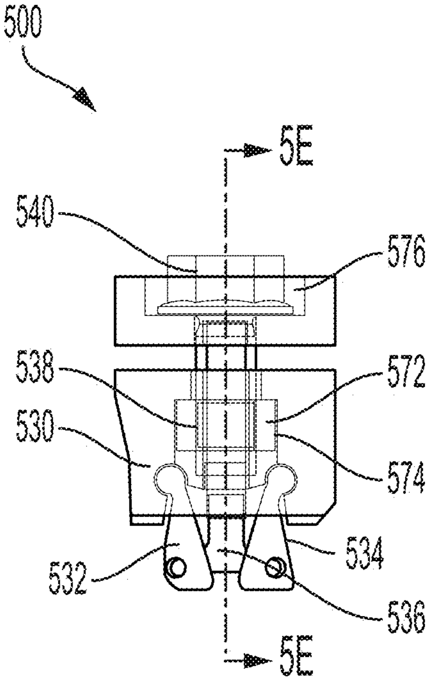
Figure 5D:
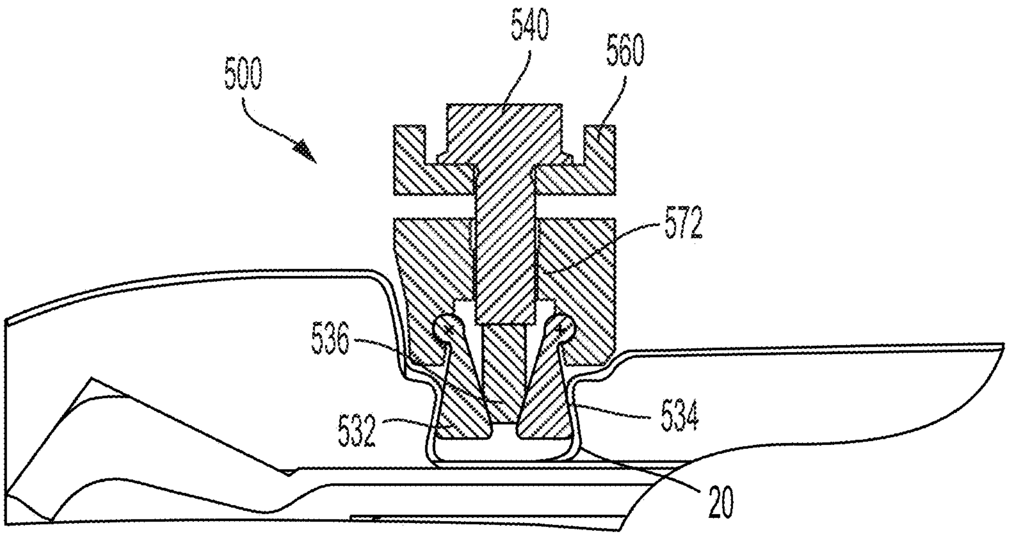
Figure 5E:
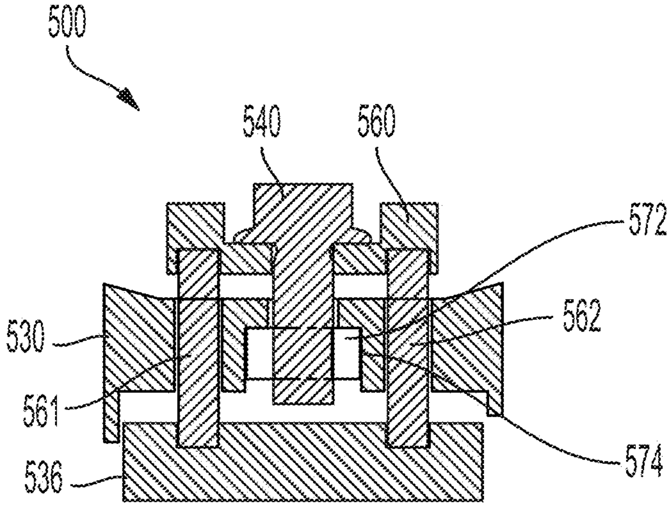
Figure 5F:
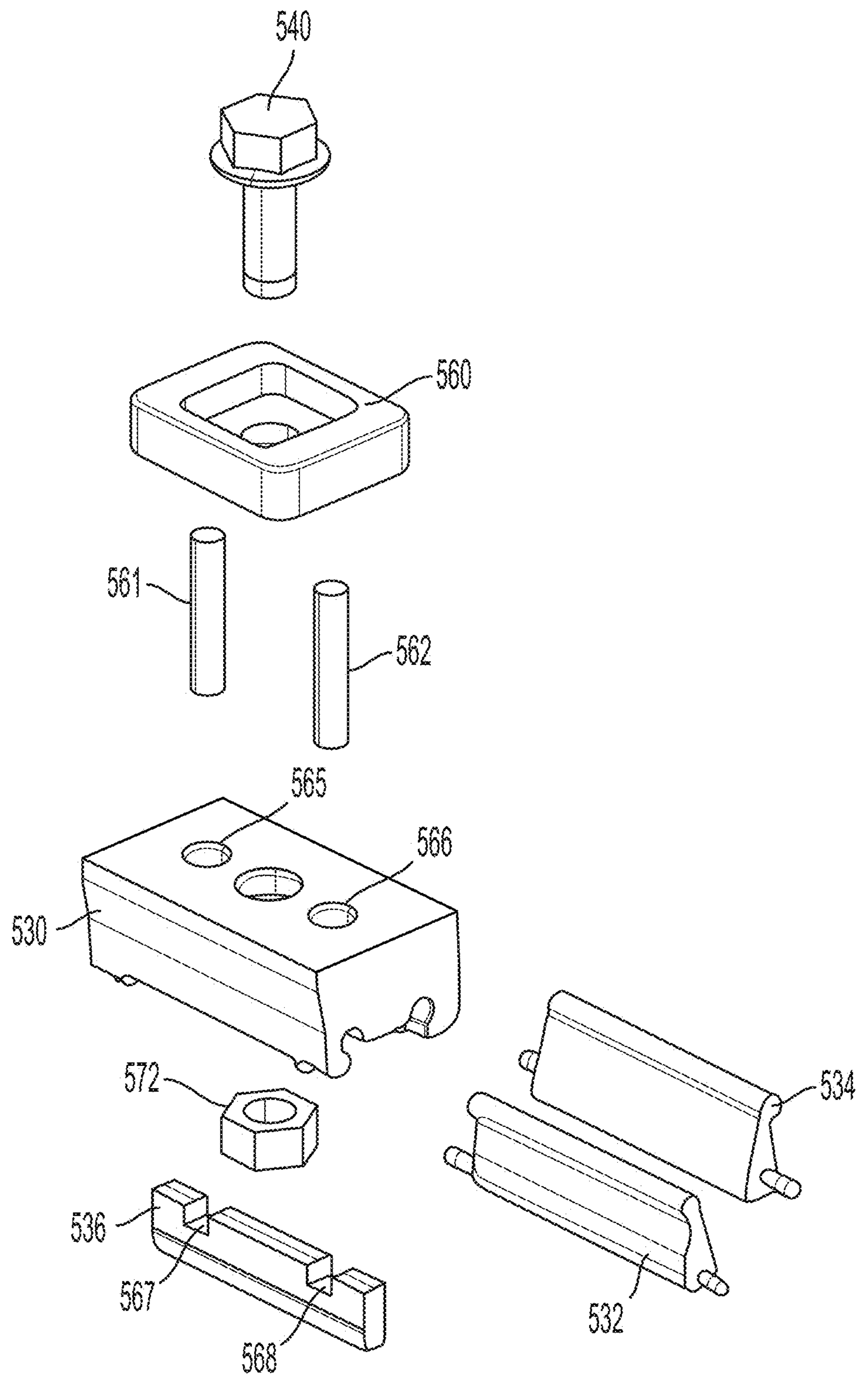

With particular focus on FIG. 5A, the first plug 532 can include a first protrusion or pin 570. The first pin 570 can extend from the first plug 532 along the longitudinal direction. The second plug 534 can include a second protrusion or pin 572. The second pin 572 can extend from the second plug 534 along the longitudinal direction. The first pin 570 and the second pin 572 can be secured together with a compression member 575, such as a spring or a rubber band, to hold the first plug 532 and the second plug 534 in compression against the wedge 536. This can help secure the wedge 536 between the first plug 532 and the second plug 534 during transit and/or during installation. In various aspects, a first end of the compression member 575 is secured to the first pin 570 and a second end of the compression member 575 is secured to the second pin 572. The compression member 575 can pull the first pin 570 toward the second pin 572. Tightening the threaded fastener 540 can cause the first plug 532 and the second plug 534 to rotate in opposite directions away from one another against the urging of the compression member 575.

Various aspects of the operation and structure of the roof rack mounting system 500 can be similar to the roof rack mounting system 200 and/or the roof rack mounting system 400 described herein and will not be repeated here for sake of brevity.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. A roof rack mounting system, comprising:

a first member structured to be attached to a roof of a vehicle;

a threaded fastener configured to be threadingly coupled to the first member;

a first plug pivotally coupled to the first member;

a second plug pivotally coupled to the first member; and a wedge movably coupled to the first member and disposed between the first plug and the second plug, the wedge is configured to extend from the first member in response to the threaded fastener rotating with respect to the first member, and the first plug and the second plug are configured to pivot in opposite directions with respect to the first member in response to the wedge extending from the first member to mechanically lock the roof rack mounting system to the roof of the vehicle.

2. The roof rack mounting system of claim 1, wherein the threaded fastener is configured to be threadingly coupled to the first member via a first threaded aperture, the first threaded aperture defines a central axis, and the first plug is configured to pivot about a second axis oriented perpendicular to the central axis.

3. The roof rack mounting system of claim 1, further comprising a load plate movable with respect to the first member and configured to move with the threaded fastener to apply a force to the wedge to cause the wedge to extend from the first member.

4. The roof rack mounting system of claim 3, further comprising:

a first load pin extending from the load plate at least partially through the first member, and the first load pin is configured to apply the force to the wedge; and a second load pin extending from the load plate at least partially through the first member, and the second load pin is configured to apply the force to the wedge.

5. The roof rack mounting system of claim 1, further comprising a second threaded aperture disposed in the first member, the second threaded aperture is configured to receive a second threaded fastener for mounting a roof rack to the first member.

6. The roof rack mounting system of claim 1, further comprising a rounded slot disposed in the first member, the first plug comprises a rounded protuberance sized and configured to be received in the rounded slot whereby the first plug rotates with respect to the first member.

7. The roof rack mounting system of claim 1, wherein the threaded fastener is coupled to the wedge via a swivel connection whereby the threaded fastener is configured to rotate with respect to the wedge.

8. The roof rack mounting system of claim 1, further comprising a first pin extending from the first plug, a second pin extending from the second plug, and a compression member extending between the first pin and the second pin for securing the first plug and the second plug in compression against the wedge.

9. A vehicle, comprising:

a roof including an elongated slot; and a roof rack mounting system coupled to the vehicle via the elongated slot, the roof rack mounting system having:

a first member structured to be attached to the roof of the vehicle;

a threaded fastener threadingly coupled to the first member;

a first plug pivotally coupled to the first member and located at least partially in the elongated slot;

a second plug pivotally coupled to the first member and located at least partially in the elongated slot; and a wedge movably coupled to the first member and disposed between the first plug and the second plug, the wedge is configured to extend from the first member in response to the threaded fastener rotating with respect to the first member, and the first plug and the second plug are configured to pivot in opposite directions with respect to the first member in response to the wedge extending from the first member to mechanically lock the roof rack mounting system to the roof of the vehicle.

10. The vehicle of claim 9, wherein the elongated slot is a drip channel of the roof.

11. The vehicle of claim 9, wherein the threaded fastener is configured to be threadingly coupled to the first member via a first threaded aperture, the first threaded aperture defines a central axis, and the first plug is configured to pivot about a second axis oriented perpendicular to the central axis.

12. The vehicle of claim 9, further comprising a load plate movable with respect to the first member and configured to move with the threaded fastener to apply a force to the wedge to cause the wedge to extend from the first member.

13. The vehicle of claim 12, further comprising a load pin extending from the load plate at least partially through the first member, and the load pin is configured to apply the force to the wedge.

14. The vehicle of claim 9, further comprising a second threaded aperture disposed in the first member, the second threaded aperture is configured to receive a second threaded fastener for mounting a roof rack to the first member.

15. The vehicle of claim 9, further comprising a rounded slot disposed in the first member, the first plug comprises a rounded protuberance sized and configured to be received in the rounded slot whereby the first plug rotates with respect to the first member.

16. The vehicle of claim 9, further comprising a cross-member mounted to the first member and extending over the roof of the vehicle.

17. The vehicle of claim 9, wherein the threaded fastener and the wedge are vertically aligned along a common vertical plane.

18. A method of attaching a roof rack mounting system to a vehicle, comprising:

moving the roof rack mounting system at least partially into an elongated slot disposed in a roof of the vehicle;

rotating a threaded fastener with respect to a first member of the roof rack mounting system to cause the threaded fastener to translate along a threaded aperture of the first member;

moving a wedge to extend from the first member in response to the threaded fastener rotating with respect to the first member;

rotating a first plug and a second plug with respect to the first member in response to the wedge extending from the first member to mechanically lock the roof rack mounting system to the roof of the vehicle.

19. The method of claim 18, wherein the first plug and the second plug rotate in opposite directions.

20. The method of claim 18, further comprising:

moving a load plate together with the threaded fastener; and applying a force on the wedge with the load plate in response to the load plate moving together with the threaded fastener to cause the wedge to extend from the first member.

* * * * *